United States Patent [19]
Ortelli

[11] Patent Number: 5,806,795
[45] Date of Patent: Sep. 15, 1998

[54] APPARATUS FOR MANOEUVRING HELICOPTERS IN SPECIALLY PREPARED AREAS OF ZONES, PROVIDED WITH A MOVABLE FRAME ON A CROSS-PIECE

[75] Inventor: Aurelio Ortelli, Bologna, Italy

[73] Assignee: Riva Calzoni S.P.A., Bologna, Italy

[21] Appl. No.: 816,320

[22] Filed: Mar. 13, 1997

[30] Foreign Application Priority Data

Mar. 13, 1996 [IT] Italy ............................ MI96 A 000485

[51] Int. Cl.⁶ ...................................................... B64F 1/04
[52] U.S. Cl. ......................... 244/116; 180/904; 414/429; 244/50
[58] Field of Search ............................ 244/50, 115, 116; 180/14.7, 904; 414/426, 430

[56] References Cited

U.S. PATENT DOCUMENTS

| 2,957,650 | 1/1960 | Horan et al. ................................ 244/50 |
| 3,790,111 | 2/1974 | Mesnet et al. ............................. 244/116 |
| 4,123,020 | 10/1978 | Korsak .................................... 244/115 |
| 5,098,035 | 3/1992 | Bernard et al. ........................... 180/904 |
| 5,110,067 | 5/1992 | Sinkkonan ................................. 244/50 |
| 5,664,743 | 9/1997 | Ortelli ....................................... 244/50 |

FOREIGN PATENT DOCUMENTS

| 0 454 357 | 10/1991 | European Pat. Off. . |
| 2 264 908 | 9/1993 | United Kingdom . |

*Primary Examiner*—Galen L. Barefoot
*Attorney, Agent, or Firm*—Herbert Dubno

[57] ABSTRACT

Apparatus for gripping, raising, orienting and transporting helicopters (2) in specially prepared areas or zones in particular on decks (1a) of ships (1), comprising a cross-piece (6) movable in a direction parallel to the longitudinal axis (X—X) of the ship in engagement with said rail (4), wherein the transverse arm (6b) of said cross-piece (6) has joined to it a substantially L-shaped frame (7; 107) and smaller arm (7a) movable relative to the cross-piece (6) in a transverse direction with respect to the longitudinal axis (X—X) itself through the action of associated actuating means (7c), the free end of said longitudinal arm (7a) of the frame (7) having rotationally attached to it a transverse member (9; 109) carrying at its opposite ends the devices (10) for gripping the main wheels of the helicopter (2).

16 Claims, 3 Drawing Sheets

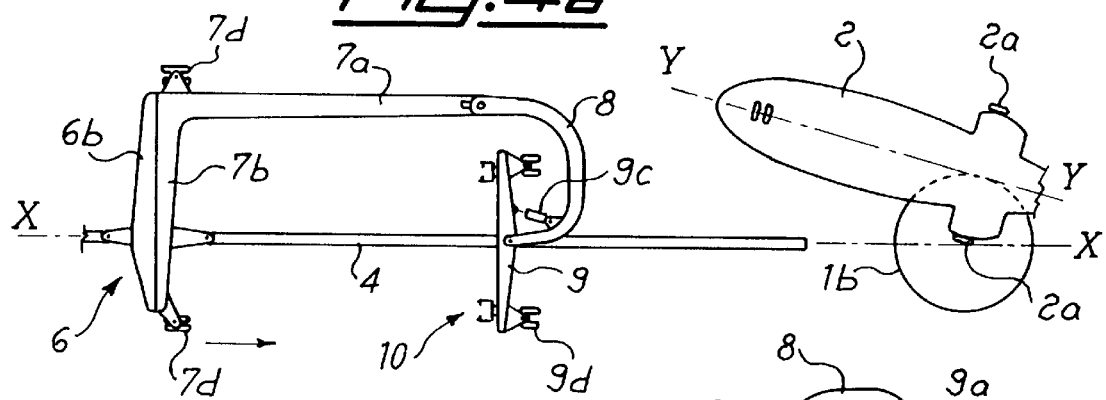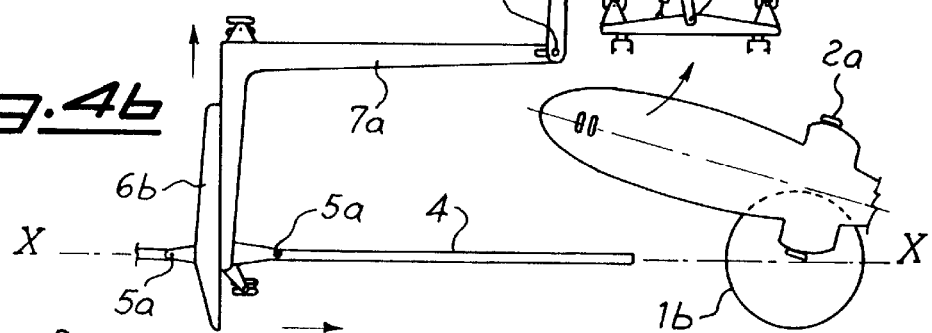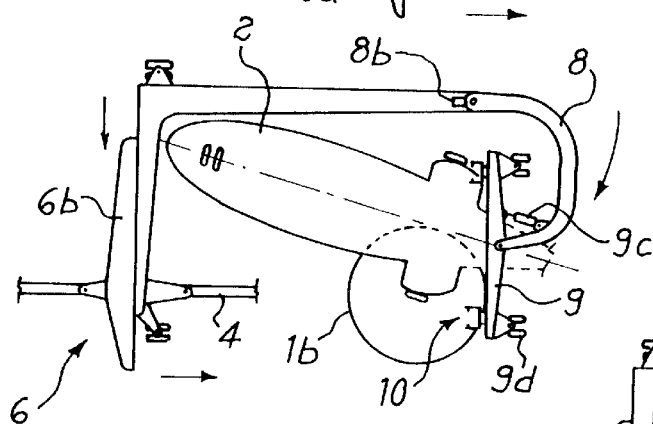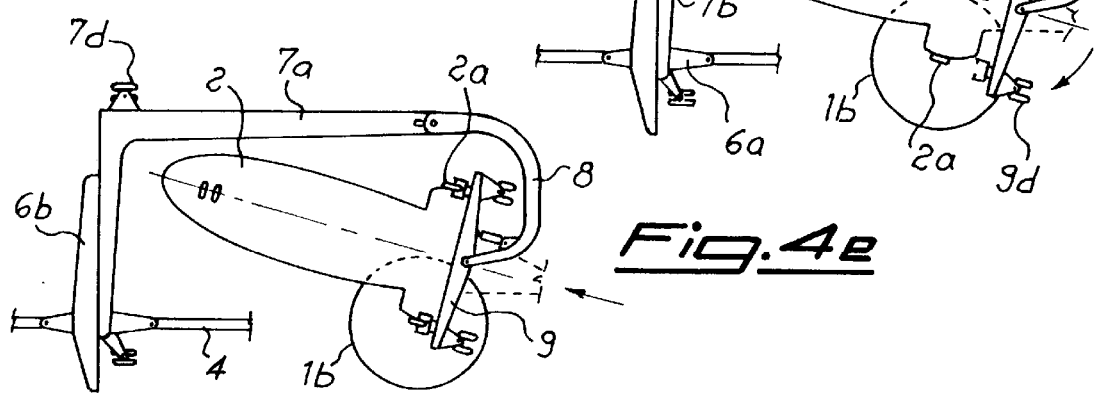

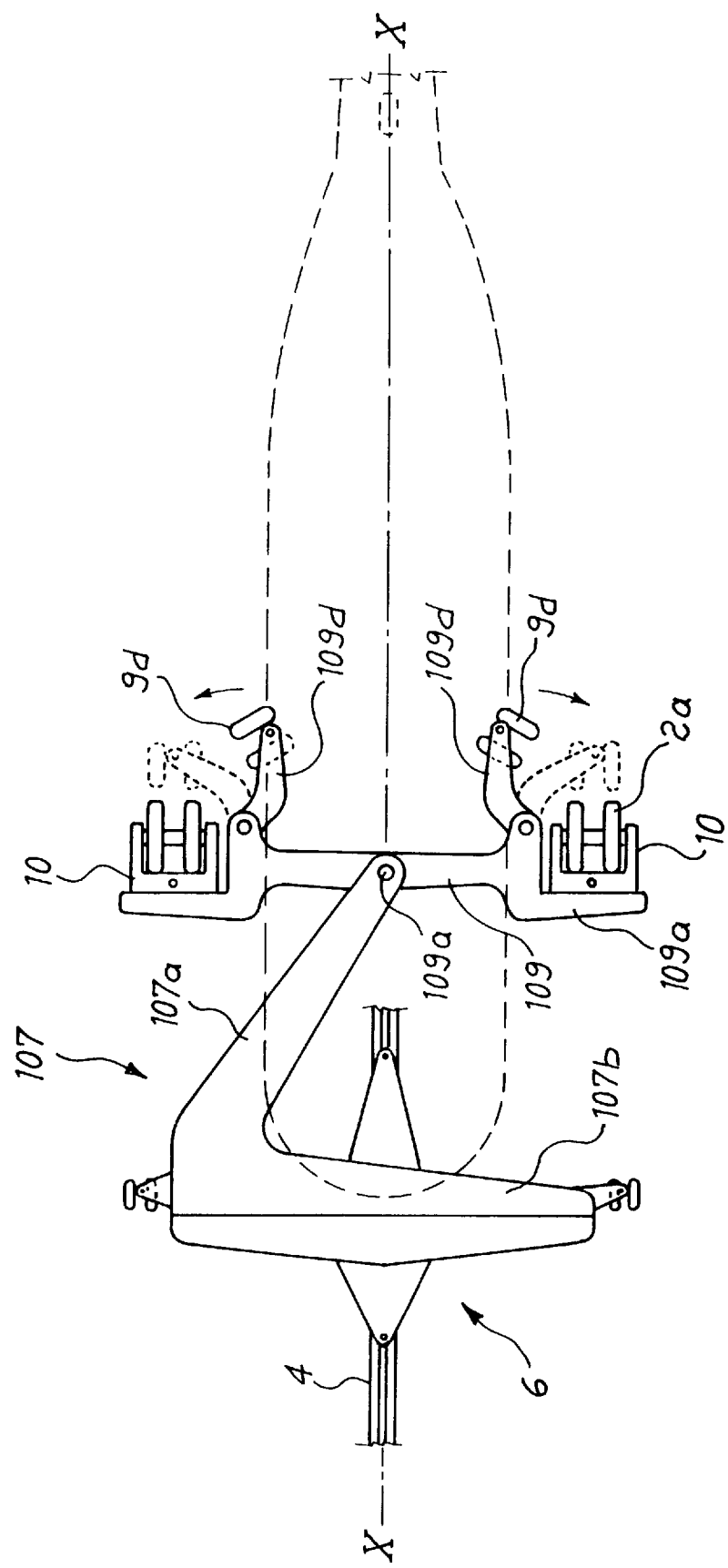

# APPARATUS FOR MANOEUVRING HELICOPTERS IN SPECIALLY PREPARED AREAS OF ZONES, PROVIDED WITH A MOVABLE FRAME ON A CROSS-PIECE

DESCRIPTION

The present invention relates to an apparatus for gripping and raising, orienting and transferring helicopters of the wheeled type in particular on board ships, platforms and the like, which comprises a substantially L-shaped frame having hinged on it a transverse beam carrying the devices for gripping and raising the helicopter wheels.

It is known how the widespread use of helicopters on-board ships poses the need for performing transportation of a helicopter from a landing area, provided on the deck itself, to inside a hangar situated on the deck of the ship itself.

This operation, however, is particularly complicated on account of several factors which result in a high degree of unpredictability as regards both the landing position on the deck and the relative position of the helicopter, the deck itself and the hangar entrance; in addition, the manoeuvre must be able to be carried out in total safety, as regards both the helicopter and personnel involved, even in very precarious conditions caused for example by strong winds and/or rough seas, resulting in pitching and rolling of the ship and an unstable equilibrium of the helicopter.

It is also known in the art of some solutions which involve the use of a carriage movable, on the deck, in a direction substantially parallel to the longitudinal axis of the ship and to which the helicopter must be hitched up after landing so that the carriage itself is able, by means of suitable devices, to transport the helicopter to the hangar.

An example of a known apparatus for gripping, moving and transporting helicopters, particularly on-board ships, platforms and the like, comprises a cross-piece movable in the longitudinal direction of the ship, said cross-piece carrying an arm which is movable transversely with respect to said longitudinal direction and which has attached to it two transverse members designed to perform rotational movements for orientation with respect to the axis of helicopter wheels and provided with devices for gripping the said wheels.

This apparatus, however, has some practical drawbacks consisting, for example, in the limited radius of action which allows gripping of the helicopter only if the latter has landed such that its longitudinal axis is inclined at a small angle with respect to the longitudinal axis of the ship.

In addition, the known apparatus requires means for gripping the helicopter wheels which are of the bidrectional pincer type, so as to ensure the balanced distribution of the helicopter's load on the cross-piece when it is brought back into the hangar.

The presence of two arms for gripping the wheels also renders complex the maintenance operations in the small spaces available inside the hangar.

The technical problem which is posed, therefore, is that of providing a simple and reliable apparatus designed to be hitched up with and raise a helicopter of the wheeled type in order to move it from any position inside a well defined landing area on the deck of a ship into position where it is correctly oriented and aligned relative to longitudinal guides provided on the deck of the ship itself for subsequent transportation towards the hangar, whereby this operation must be made easy to perform and repeatable whatever the relative position of the helicopter within the landing area and in the event of said helicopter being oriented at a considerable angle with respect to the longitudinal axis of the ship.

Moreover, this operation must be able to be carried out automatically and/or manually, but without requiring manual operations for fixing the wheels to the apparatus, and the apparatus itself must be able to be stored away inside the hangar until the moment when it is actually used for recovery of the helicopter.

These results are obtained by the present invention, which provides an apparatus for gripping and raising, orienting and transporting helicopters in particular for ship decks provided with longitudinal rails for guiding and constraining in an anti-tilting manner rollers connected to the apparatus, which apparatus consists of a cross-piece movable in a direction parallel to the longitudinal axis of the ship in engagement with said rail, the transverse arm of said cross-piece having joined to it a substantially L-shaped frame movable relative to the cross-piece in a transverse direction through the action of associated actuating means; the free end of the bigger arm of said "L" having hinged on it a transverse member movable in rotation with respect to said bigger arm.

The opposite ends of said transverse member are provided with the devices for gripping the main wheels of the helicopter together with associated means for raising the said wheels once they have been gripped.

Further details may be obtained from the following description, with reference to the accompanying drawings, in which:

FIG. 4a–4e show the sequence for gripping and moving the helicopter by means of the apparatus according to FIG. 2; and FIG. 5 shows a variation of an example of embodiment of the device for gripping a helicopter with a rear wheel.

Figure 1:
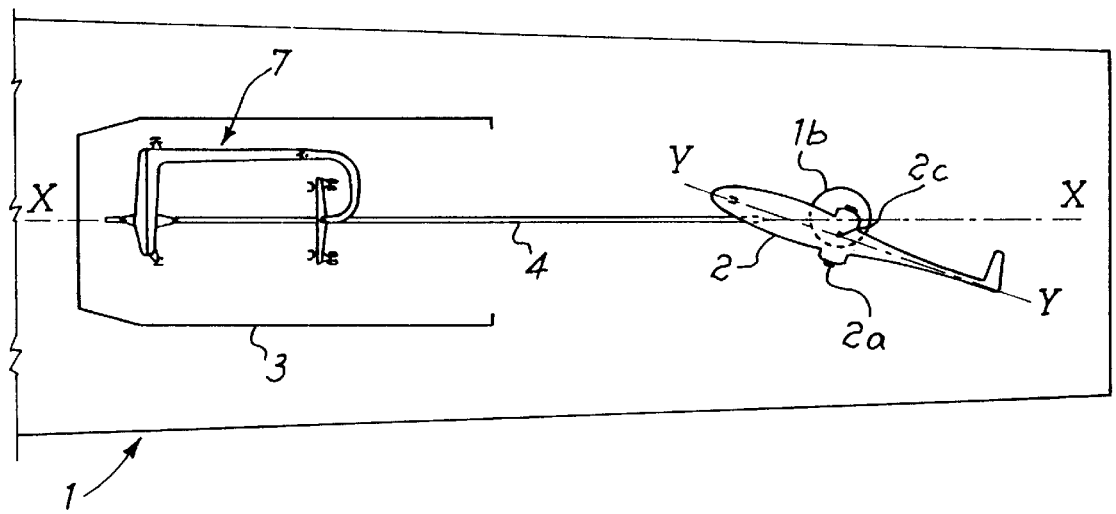
FIG. 1 shows a plan view of the ship provided with the apparatus according to the invention.
Figure 2:
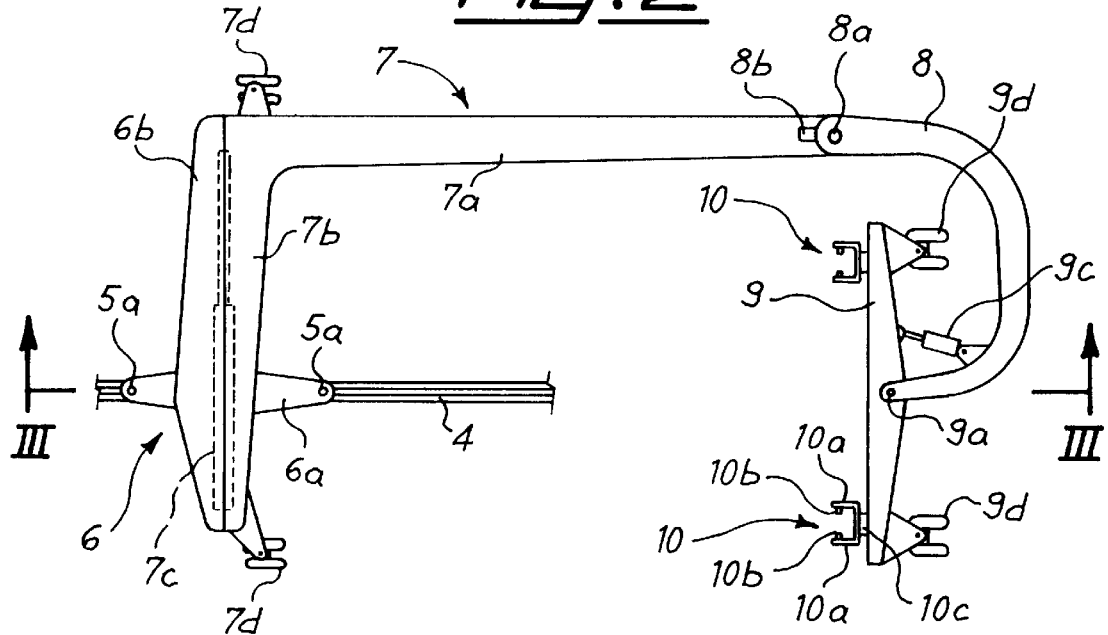
FIG. 2 shows a plan view of the apparatus according to the invention.

As shown in FIG. 1, the deck 1a of the ship 1, whose longitudinal direction is indicated by the axis X—X, is provided with a grid 1b to which the helicopter 2 must be secured by means of its own hitching device 2c, after landing on the deck 1a of the ship. Once it has landed and been hitched up to the grid, the helicopter may be in any position inside the grid, with its longitudinal axis Y—Y at an angle relative to the longitudinal axis X—X of the ship, with respect to which it must therefore be aligned for subsequent transfer inside the hangar 3.

Figure 3:
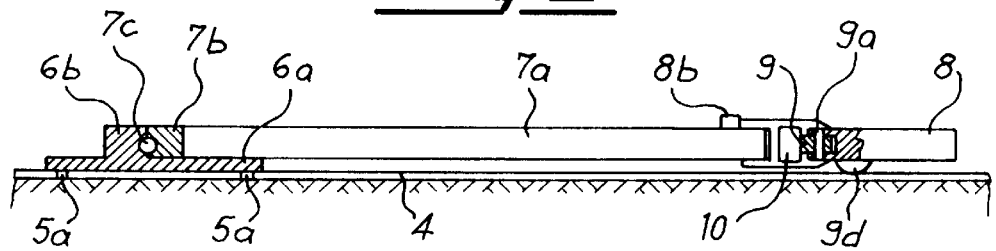
FIG. 3 shows a diagrammatic cross-section along the plane indicated by III—III in FIG. 2.

For this purpose, the deck 1a is provided with a longitudinal rail 4 extending from inside the hangar as far as said grid 1b. As shown in the cross-section in FIG. 3, two travel and anti-tilting carriage units 5a are engagably mounted on said rail 4 and are respectively attached to the opposite ends of an arm 6a arranged parallel to the longitudinal axis of the ship and forming the first arm of a cross-piece 6, the transverse arm 6b of which is arranged in the vicinity of the end opposite to that for gripping the helicopter.

Said transverse arm 6b of the cross-piece 6 has engageably mounted on it, via a prism-guide coupling system, the transverse arm 7b of an L-shaped frame 7, the bigger arm 7a of which is arranged parallel to the longitudinal axis X—X of the ship 1.

The L-shaped frame 7 is able to move transversely in either direction, relative to the cross-piece to which it is joined, by means of a hydraulic cylinder 7c arranged between the two said transverse arms 6b, 7b.

The opposite ends of the transverse arm 7b have fitted to them pairs of swivel wheels 7d which rest directly on the deck.

The longitudinal arm 7a of the frame 7 carries, at its free end, a curved arm 8 rotationally joined to the frame by means of a pin 8a about which it is able to rotate through angles of about 90°, moved by a hydraulic cylinder not shown, for passage from the open position which allows a movement laterally with respect to the helicopter, into a closed working position.

In said working position the arm 8 is locked by means of a bolt 8b designed to transmit the maximum flexural force applied to said arm.

At its free end the said curved arm 8 in turn has hingeably mounted on it a transverse member 9 which can be oriented with respect to the arm 8 by means of rotations about a pin 9a effected by a hydraulic cylinder 9c.

The opposite ends of the transverse member 9 have mounted on them pairs of wheels 9d which rest directly on the deck and which, together with the wheels 7d of the frame 7, form a base for supporting the apparatus, having a substantially rectangular shape and a considerable width which ensures stability against lateral tipping.

At the same ends of the transverse member, but in an opposite position with respect to the swivel wheels 9d, there are provided the devices 10 for gripping the wheels 2a of the helicopter shown schematically with two small arms 10a movable symmetrically relative to one another in a transverse direction with respect to the axis X—X and provided with pins 10b for engagement in corresponding seats provided on the axes of the wheels 2a of the helicopter.

Said gripping means are also connected to a cylinder 10c which allows raising thereof with respect to the deck once the helicopter wheels have been gripped.

The apparatus functions as follows:

The helicopter 2 lands on the deck 1a and is secured to the grid 1a by means of its hitching device 2c.

After decking (FIG. 4a), the helicopter may be positioned laterally with respect to the centre of the grid and with its axis Y—Y at a certain inclination with respect to the axis X—X of the ship.

The apparatus emerges from the hangar 3 moving along the rail 4 to approach the helicopter; then (FIG. 4b) the L-shaped frame 7 is displaced laterally with respect to the cross-piece 6 and is arranged such that its longitudinal axis corresponds to the geometrical centre between the two main wheels 2a of the helicopter 2.

At the same time the curved arm 8 is rotated outwards by 90° so as to allow the apparatus to pass laterally with respect to the helicopter (FIG. 4b); once the curved arm has gone past the wheels 2a of the helicopter a certain distance, the curved arm 8 is rotated inwards (FIG. 4c) and locked in position by means of the bolt 8b so that the mechanical rigidity of the frame 7 is also restored.

At this point, by acting on its transverse arm 7b, the L-shaped frame is translated so as to bring the pivot 9a onto the longitudinal axis Y—Y of the helicopter (FIG. 4c), rotating also (FIG. 4d), by means of the cylinder 9c, the transverse member 9 so as to bring it into a position parallel to the axis of the wheels 2a of the helicopter.

By means of coordinated movements in the longitudinal direction of the cross-piece 6 and transverse direction of the frame 7, the transverse member 9 is then displaced towards the said wheels (FIG. 4e) until the gripping devices 10 come into contact with them, completing the gripping cycle.

At this point the helicopter has been firmly gripped by the apparatus and the hooking device keeping it attached to the deck can be released; the cylinders 10c then raise off the ground the wheels of the helicopter which, as of this moment, forms a single body with the apparatus which is able to orient it parallel to the axis X—X by means of operation of the cylinder 9c and bring it into alignment with the axis X—X itself by means of operation of the cylinder 7c which laterally translates the L-shaped frame 7 with respect to the cross-piece 6 until it brings the axis of the helicopter into alignment with the axis of the hangar.

It is now possible to perform translation of the cross-piece in order to transfer the helicopter into the hangar.

During the various movements of the carriage, the swivel wheels 8 are automatically oriented in the required direction.

FIG. 5 illustrates a second embodiment of the apparatus particularly suitable for helicopters of the type with the small guide wheel in the rear rather than front position.

In this case the bigger arm 107a of the frame 107 is arranged at an acute angle with respect to the transverse arm 107b and the transverse member 109 is directly attached to said angled arm 107a by means of a vertical pin 109a.

The opposite ends of the transverse beam 109 are moreover formed in the manner of a "U" oriented in the transverse direction with respect to the longitudinal axis (X—X).

One (109d) of the arms of the "U" is hinged and carries roller wheels 9d for resting on the deck, while the other fixed arm of the "U" has attached to it the devices 10 for gripping the wheels 2a of the helicopter.

In this case the absence of the front wheel of the helicopter allows the apparatus to approach the wheels frontally.

As illustrated in FIG. 5, in order to allow this manoeuvre, the hinged arm 109d of the "U" at the end of the transverse member is initally rotated into an open position so as to allow engagement of the gripping devices with the wheels; once the gripping operation has been completed, the arm 109d is brought back into the closed position so as to allow the subsequent operations already described.

In the constructional embodiments of the parts which make up the apparatus according to the invention, the transverse movement of the U-shaped structure may also be performed by means of mechanical gear systems of the rack-and-pinion type.

Many variants may be introduced as regards the realization of the parts which make up the invention, without thereby departing from the protective scope of the present invention as defined by the claims which follow.

I claim:

1. Apparatus for gripping, raising, orienting and transporting helicopters (2) in particular for decks (1a) of ships (1) provided with longitudinal rails (4) for guiding and constraining the apparatus, comprising a cross-piece (6) movable in a direction parallel to a longitudinal axis (X—X) of the ship in engagement with said rail (4), characterized in that a transverse cross-piece arm (6b) of said cross-piece (6) has joined to it a substantially L-shaped frame (7; 107) having a longitudinal arm (7a) and a transverse arm (7b) movable relative to the cross-piece (6) in a transverse direction with respect to the longitudinal axis (X—X), through the action of an associated actuating means (7c), a free end of said longitudinal arm (7a) of the frame (7) having rotationally attached to it a transverse member (9; 109) carrying at its opposite ends the devices (10) for gripping and raising the main wheels of the helicopter (2).

2. Apparatus according to claim 1, characterized in that said cross-piece (6) comprises a longitudinal cross-piece arm (6a) attached to rollers (5a) travelling inside said longitudinal rail (4) and movable parallel to the longitudinal axis of the ship through the action of associated actuating means, said longitudinal cross-piece arm having attached to it a transverse cross-piece arm (6b).

3. Apparatus according to claim 1, characterized in that the transverse arm (7b) of said L-shaped frame (7) is joined to the transverse cross-piece arm (6b) of the cross-piece (6) by means of prism guides on which it is able to travel in a transverse direction and in either sense moved by a hydraulic cylinder (7c) arranged between said transverse arms (6b, 7b) of the cross-piece and the frame, respectively.

4. Apparatus according to claim 1, characterized in that the longitudinal arm (7a) of the frame (7) is parallel to the longitudinal axis (X—X) of the ship (1).

5. Apparatus according to claim 1, characterized in that said transverse member (9) is joined to the arm (7a) of the L-shaped frame 7 by means of an additional arm (8) hinged on said arm (7a) of the frame (7).

6. Apparatus according to claim 5, characterized in that said hinging arm (8) passes from an open position into a closed working position where it is locked by means of associated locking means (8b).

7. Apparatus according to claim 1, characterized in that the free ends of said transverse member (9; 109) have fitted to them swivel wheels (9d) for resting on the deck (1a).

8. Apparatus according to claim 1, characterized in that said transverse member (9) carries swivel wheels (9d) for resting on the deck, arranged in an opposite position with respect to the devices (10) for gripping the wheels of the helicopter.

9. Apparatus according to claim 1, characterized in that the longitudinal arm (107a) of the frame (107) forms an acute angle with the transverse arm (107b) of the frame (107).

10. Apparatus according to claim 9, characterized in that said transverse member (109) is rotationally attached to said angled arm (107a) of the frame (107) by means of a pin (109a).

11. apparatus according to claim 9, characterized in that said transverse member (109) has ends formed in the manner of a "U" oriented transversely with respect to the longitudinal axis (X—X).

12. Apparatus according to claim 11, characterized in that one (109d) of the arms of the "U" is hinged and carries swivel wheels (9d) for resting on the deck (1a) of the ship.

13. Apparatus according to claim 1, characterized in that said transverse member (9; 109) carries at its ends the gripping devices (10) with associated means (10c) for raising the helicopter wheels once the wheels themselves have been engaged and gripped.

14. Apparatus according to claim 1, characterized in that a swivel wheel (7d) for resting on the deck (1a) of the ship is present at the opposite ends of the transverse arm (7b; 107b) of the L-shaped frame (7; 107).

15. Apparatus according to claim 1, characterized in that said means for actuating the L-shaped frame (7; 107) consist of mechanical means.

16. Apparatus according to claim 1, characterized in that said devices for raising the helicopter are directly associated with the devices for gripping the wheels (2a).

* * * * *